US010065504B2

(12) United States Patent
Ochiai et al.

(10) Patent No.: US 10,065,504 B2
(45) Date of Patent: Sep. 4, 2018

(54) INTELLIGENT TUTORIAL FOR GESTURES

(71) Applicant: Toyota Motor Engineering & Manufacturing North America, Inc., Erlanger, KY (US)

(72) Inventors: Yuichi Ochiai, Cupertino, CA (US); Katsumi Nagata, Foster City, CA (US); Akira Sasaki, San Jose, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 188 days.

(21) Appl. No.: 15/143,533

(22) Filed: Apr. 30, 2016

(65) Prior Publication Data

US 2017/0315824 A1    Nov. 2, 2017

(51) Int. Cl.

| | |
|---|---|
| *G06F 3/041* | (2006.01) |
| *B60K 35/00* | (2006.01) |
| *G06F 3/01* | (2006.01) |
| *G06F 3/0354* | (2013.01) |
| *G06F 3/00* | (2006.01) |
| *G06F 3/03* | (2006.01) |
| *G06F 3/0488* | (2013.01) |
| *G06F 9/451* | (2018.01) |

(52) U.S. Cl.
CPC .............. *B60K 35/00* (2013.01); *G06F 3/005* (2013.01); *G06F 3/017* (2013.01); *G06F 3/0304* (2013.01); *G06F 3/03547* (2013.01); *G06F 3/04883* (2013.01); *G06F 9/453* (2018.02); *B60K 2350/1052* (2013.01)

(58) Field of Classification Search
CPC .... G06F 9/4446; G06F 3/017; G06F 3/03547; B60K 2350/1052
USPC ........................................................ 345/173
See application file for complete search history.

(56) References Cited

U.S. PATENT DOCUMENTS

| | | | |
|---|---|---|---|
| 6,711,499 B2 | 3/2004 | Millington | |
| 7,756,617 B1 * | 7/2010 | Cluff ................... | G07C 5/0858 340/476 |
| 2011/0296304 A1 | 12/2011 | Kempe | |
| 2016/0187992 A1 * | 6/2016 | Yamamoto .............. | G06F 3/017 345/156 |

\* cited by examiner

*Primary Examiner* — Nicholas Lee
*Assistant Examiner* — Ngan T Pham Lu
(74) *Attorney, Agent, or Firm* — Christopher G. Darrow; Darrow Mustafa PC

(57) ABSTRACT

Systems and methods are provided for training a plurality of users of a vehicle to use gestures as a short-cut for controlling vehicle functions. The methods monitor a plurality of tasks related to controlling vehicle functions completed by a unique user. For each task, the method may determine whether the task has been completed by the unique user either using a predefined gesture associated with the task, or manually, without using the predefined gesture associated with the task. For each task, the method designates the predefined gesture as being either a learned gesture or an un-learned gesture. After a predetermined time period, the method may include determining that a gesture usage history associated with the unique user includes at least one un-learned gesture. User-customized instructions that at least one un-learned gesture is available for use as a short-cut for controlling a vehicle function may be presented to the unique user.

20 Claims, 4 Drawing Sheets

INTELLIGENT TUTORIAL FOR GESTURES

TECHNICAL FIELD

The present disclosure generally relates to gesture usage for controlling vehicle functions, and more particularly, to systems and methods for presenting a customized tutorial to a driver regarding an availability of using gesture controls as short-cuts to manual controls.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Many electronics and vehicle systems are increasingly being configured such that certain tasks or operational functions can be controlled, at least in part, by gestures. In a vehicle, the use of gestures may minimize distraction while driving. New gestures are being created at an increasing pace. Different vehicles may use different gestures for similar controls. Thus, it may be confusing for a user to remember all of the available gestures that may be available for completing certain tasks or vehicle functions. Further, multiple unique users may operate a single vehicle, with each user having a different knowledge of gestures, and a different user experience.

Accordingly, it would be desirable to provide customized, intelligent tutorials and presentations to users regarding the use of gestures in place of manual controls.

SUMMARY

This section provides a general summary of the disclosure, and is not a comprehensive disclosure of its full scope or all of its features.

In various aspects, the present teachings provide a computer-implemented method for training at least one of a plurality of users of a vehicle to use gestures for controlling one or more vehicle functions. The method can include determining that a task related to controlling a vehicle function has been manually completed by a unique user of the vehicle without using a predefined gesture associated with the task. The predefined gesture associated with the task is then designated as being an un-learned gesture. The method may include determining, after a predetermined time period, that a gesture usage history associated with the unique user includes at least one un-learned gesture. The method may further include presenting, to the unique user, customized instructions that at least one un-learned gesture is available for use as a short-cut for controlling a vehicle function.

In other aspects, the present teachings provide a computer-implemented method for training at least one of a plurality of users of a vehicle to use gestures as a short-cut for controlling one or more vehicle functions. The method may include monitoring a plurality of tasks related to controlling vehicle functions that have been completed by a unique user of the vehicle. For each task, the method may include determining whether the task has been completed by the unique user either: (a) using a predefined gesture associated with the task; or (b) manually, without using the predefined gesture associated with the task. The method may then include, for each task, designating, the predefined gesture associated with the task as being either: (a) a learned gesture, if the unique user completed the task using the predefined gesture associated with the task; or (b) an un-learned gesture, if the unique user manually completed the task. After a predetermined time period, the method may include determining that a gesture usage history associated with the unique user includes at least one un-learned gesture. The method may further include presenting, to the unique user, customized instructions that at least one un-learned gesture is available for use as a short-cut for controlling a vehicle function.

In still other aspects, the present teachings provide a system for training a plurality of users of a vehicle to use gestures for controlling vehicle functions. The system may include one or more sensors configured to receive gesture information, a computing device in communication with the one or more sensors, one or more processors for controlling operations of the computing device, and a non-transitory computer readable medium for storing data and program instructions used by the one or more processors. The one or more processors are configured to execute instructions stored in the non-transitory computer readable medium to perform various methods. The methods may include determining that a task related to controlling a vehicle function has been manually completed by a unique user of the vehicle without using a predefined gesture associated with the task. The predefined gesture associated with the task is designated as being an un-learned gesture. The methods may include determining, after a predetermined time period, that a gesture usage history associated with the unique user includes at least one un-learned gesture. The methods may further include presenting, to the unique user, customized instructions that at least one un-learned gesture is available for use as a short-cut for controlling a vehicle function.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides systems and methods for personalized, intelligent training for at least one of a plurality of unique users of a vehicle to use gestures as a short-cut for controlling vehicle functions. The methods may include monitoring a plurality of tasks related to controlling vehicle functions that have been completed by each unique user of the vehicle. Each unique user may be identified by various means, including the use of different keys, facial recognition, biometric identifiers, phone/device pairings, etc. For each task that is performed related to one or more vehicle systems or vehicle functions, the method may include determining whether the task has been completed by the unique user either: (a) using a predefined gesture associated with the task; or (b) manually, without using the predefined gesture associated with the task. The method may then include, for each task, designating, the predefined gesture associated with the task as being either: (a) a learned gesture, if the unique user completed the task using the predefined gesture associated with the task; or (b) an un-learned gesture, if the unique user manually completed the task. After a predetermined time period, the method may include determining that a gesture usage history associated with the unique user includes at least one un-learned gesture. The method may further include presenting, to the unique user, instructions that at least one un-learned gesture is available for use as a short-cut for controlling a vehicle function.

Figure 1:
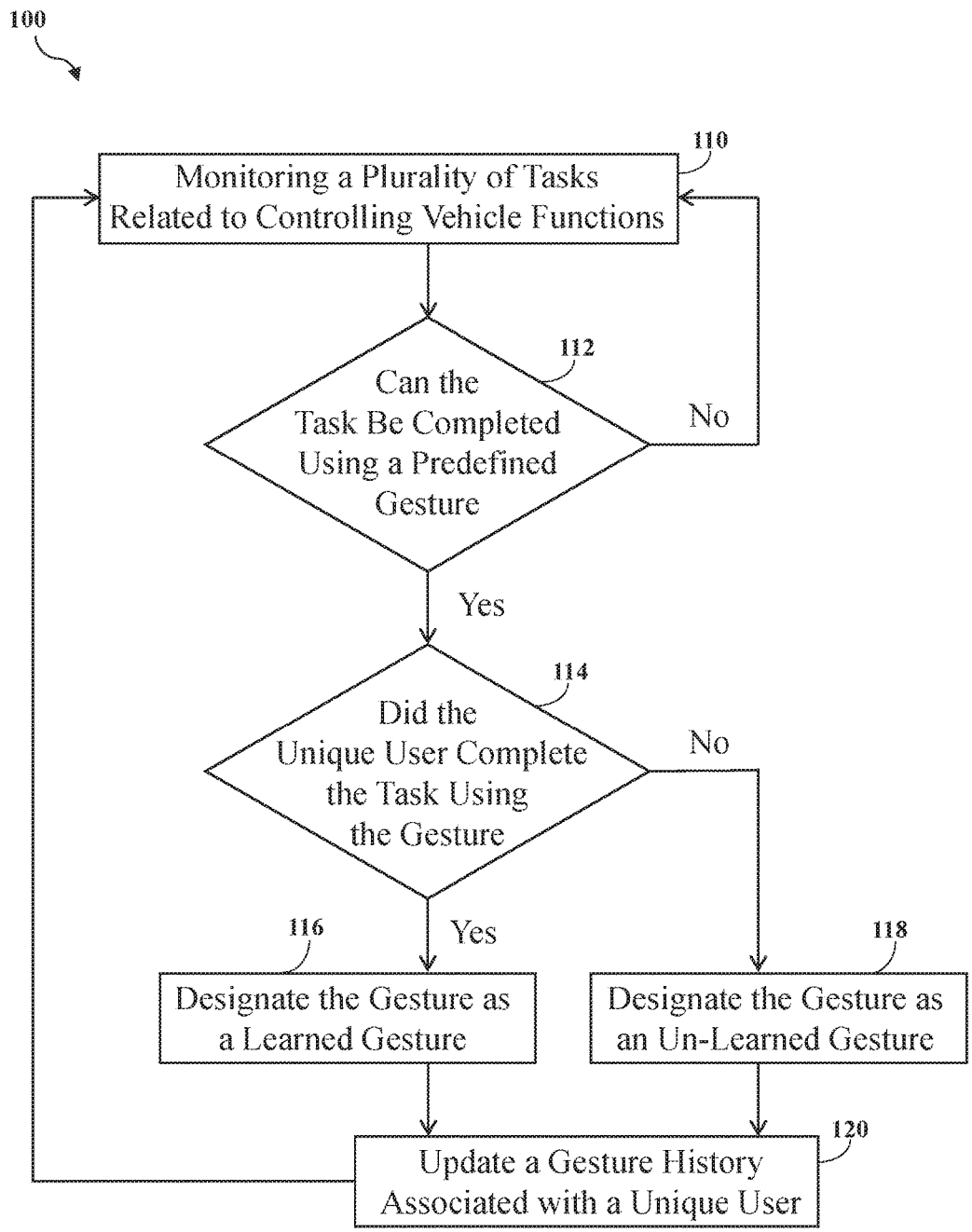
FIG. 1 illustrates a high level flowchart of a first set of exemplary operations of a computer-implemented method for monitoring tasks, determining how tasks were performed, and categorizing preassigned gestures according to various aspects of the present technology.
Figure 2:
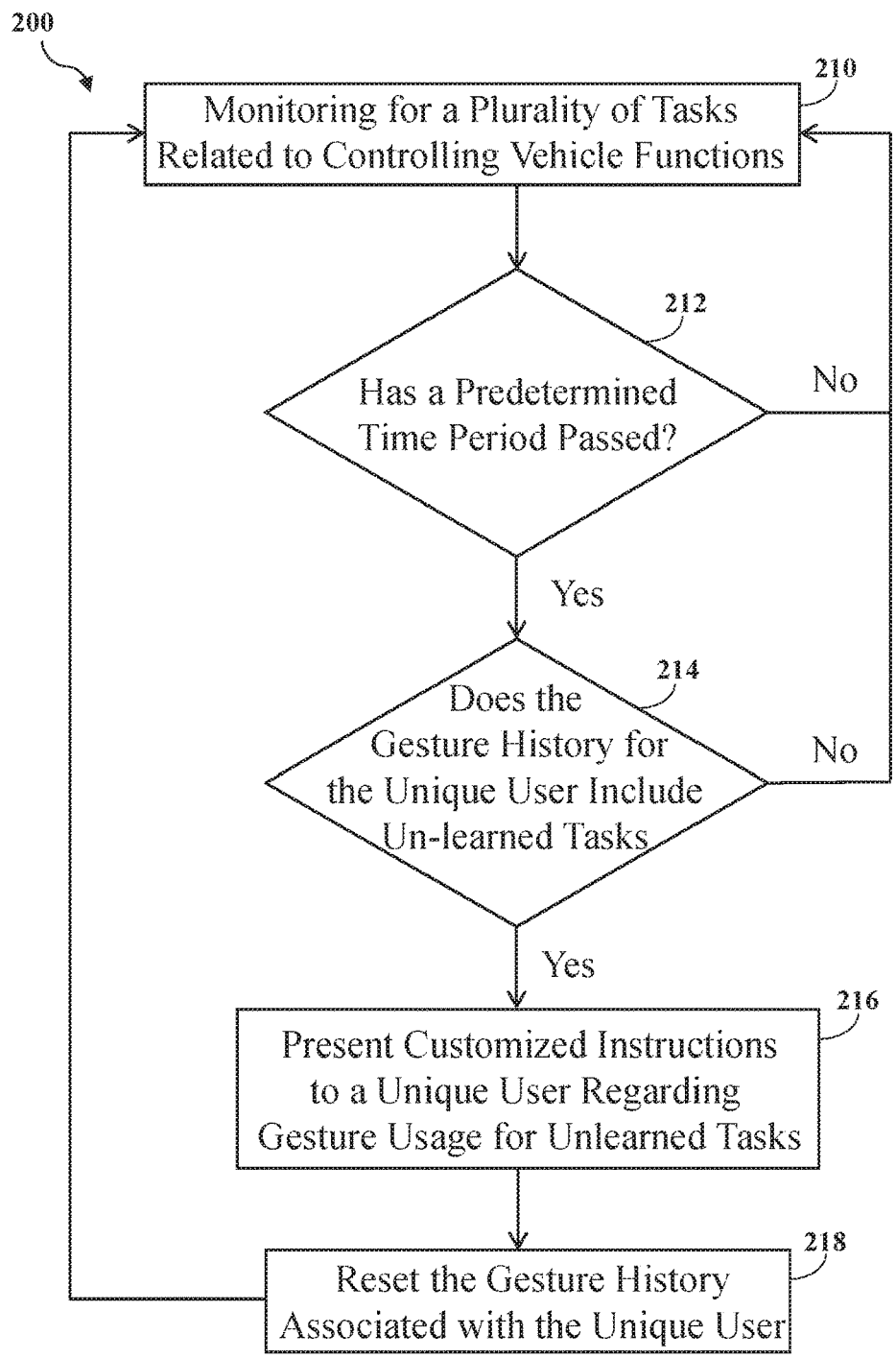
FIG. 2 illustrates a high level flowchart of a second set of an exemplary operations including monitoring tasks, ascertaining whether a predefined time period has passed, and presenting customized instructions to a unique user regarding the use of gestures for vehicle functions.

FIG. 1 depicts a high level flowchart illustration of a first set of exemplary operations of a computer-implemented method 100 for monitoring tasks, determining how tasks were performed, and categorizing preassigned gestures according to various aspects of the present technology. FIG. 2 depicts a high level flowchart illustration of a second set of an exemplary operations 200 including steps of monitoring tasks, ascertaining whether a predefined time period has passed, and presenting customized instructions to a unique user regarding the use of gestures for vehicle functions. The features and steps as illustrated in FIGS. 1 and 2 are intended to be used together, although they may be separated and/or modified as desired. Reference may be made herein to the flowchart illustrations and block diagrams of methods, systems, and computer program products according to implementations of this disclosure. Aspects thereof may be implemented by computer program instructions, as will be discussed in more detail below.

Notably, as used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

As used herein, the term "gesture" generally refers to a form of non-verbal communication in which visible human bodily actions and/or movements are used to convey a message, although verbal communications may be used to supplement the non-verbal communication. As an example, gestures include movement of the hands, fingers, arms, face, eyes, mouth, or other parts of the body of an occupant user. Gestures may be two-dimensional movements, for example a movement of one or more fingers on a touch pad or touch screen. Gestures may also be three-dimensional movements of the body. Gestures useful with the present technology may be predefined by vehicle systems. It is envisioned that users may also modify the gestures and/or create customized gestures for use with the systems and methods disclosed herein.

In certain aspects, a gesture recognition device (discussed in more detail below) may be designed to also detect and identify gestures produced by non-human being, including those produced by an object or a machine. For example, the gesture recognition device may be configured to detect and identify certain light patterns or frequencies or pressures that may serve as triggers for various operations. In one aspect, the gesture recognition device may include one or more cameras for detecting gestures. The cameras may be internal to the gesture recognition device, or the gesture recognition device may use cameras that are external to it, but that may be otherwise positioned inside the passenger interior compartment. No matter the trigger that can act as a gesture, a set of digitized reference signals is typically stored as part of one or more gesture databases or libraries, and the gesture recognition device may map/analyze the received gestures against this set of reference gestures. Additional reference gesture databases or libraries could be located in cloud-based databases through network access.

There are several ways a user may commence a gesture, or start an action with an input system that can detect a gesture. For example, the user may simply announce a predetermined voice command; actuate a mechanical component, such as engaging a button or knob that is located within reach of the user (e.g. on a steering wheel), or applying pressure to a pressure sensitive screen or touch pad; or may perform a predetermined gesture to initiate a task related to a vehicle function. As another example, the user may select an application, which can be displayed on a display device to initiate a task.

With renewed reference to FIG. 1, various methods include monitoring the actuation and/or completion of a plurality of tasks related to controlling one or more vehicle functions as shown by method step 110. In one non-limiting example, the vehicle function may generally pertain to the operation of a radio or entertainment system. Other exemplary vehicle functions may include controlling HVAC settings, locks, windows, cruise control, navigation systems, parking controls, etc. By way of example, non-limiting specific tasks for radio vehicle functions may include changing a radio station, switching the source to a CD player, or adjusting the volume. One or all of these exemplary tasks may be able to be completed using a gesture, in addition to being able to be completed using buttons, dials, or other common manual controls. In various aspects, each gesture may be preassigned and associated with a task.

As referenced by step 112, the method may include determining, separately for each task, whether it is possible for the task to be completed using a predefined, or customized, gesture. If yes, the method proceeds to determine whether the task has been completed by the unique user using the predefined gesture associated with the task, or manually, without using the predefined gesture, as indicated by step 114. If it is determined that the task was completed by the unique user using the predefined gesture, the methods tag, categorize, or otherwise designate that predefined gesture as a learned gesture, as indicated by step 116. Alternatively, if it is determined that the task was completed manually, i.e., without using the predefined gesture associated with that task, the methods tag, categorize, or otherwise designate that predefined gesture as an un-learned gesture, as indicated by step 118.

In various aspects, as indicated by method step 120, after a predefined gesture is designated as learned or un-learned, a gesture usage history may be updated. The gesture usage history can be a file, database, or similar collection of data, and may include various information, including a count of a number of times each task is completed with or without using the predefined gesture associated with the respective task. Each unique user may have a separate gesture usage history, or the gesture usage history should otherwise be configured to be parsed by unique user. The steps of the method as shown in FIG. 1 can repeat as desired.

With renewed reference to FIG. 2, various operations refer again as a point of reference to the feature of monitoring a plurality of tasks related to controlling one or more vehicle functions, as shown by method step 210. In various aspects the methods may monitor for the expiration of a predetermined time period or other statistical data point(s) of interest. For example, in certain aspects, the method determines that a predetermined time period has passed, as indicated by method step 212. In various aspects the predetermined time period may be based on a number of calendar days, or a number of calendar days during which the vehicle is driven by a user, for example, omitting days when the vehicle is not driven. In other aspects, the predetermined time period may be based on a number of hours, or a number of miles driven by the unique user, or a combination of any of the number of days, hours, and miles. It is envisioned that the number of hours or miles can further be categorized by time of day, average speed, type of traffic, number of occupants in the vehicle, weather conditions, etc.

Once it is established that a predetermined time period or threshold has been met or exceeded, the gesture usage history associated with the unique user of the vehicle may be reviewed to determine whether it includes at least one un-learned gesture, as indicated by method step 214. If there are no un-learned gestures, the method continues and reverts back to step 210, and continues to monitor tasks. If there is at least one un-learned gesture, or another established number, the methods may present instructions to the unique user regarding the availability of preassigned gestures, as indicated by step 216. For example, customized instructions may be presented to the unique user that at least one un-learned gesture is available for use as a short-cut for controlling a vehicle function that the user has been completing manually. It is envisioned that the instructions may be presented to the driver during a safe time during operation of the vehicle, during vehicle start-up, or upon shutdown of the vehicle.

In certain aspects, it may be determined that the gesture usage history includes a plurality of un-learned gestures, and the methods include presenting, to the unique user, instructions that at least one of the plurality of un-learned gestures is available for use as a short-cut for controlling a vehicle function. As mentioned above, the gesture usage history may include a count of a number of times each task is completed with or without using the predefined gesture associated with the respective task. The methods may include determining whether the count exceeds a threshold or predetermined value prior to presenting the customized instructions to the unique user. In various aspects, the gesture usage history may include other learning logic associated with each unique user, and for ease of accessibility, the gesture usage history may be saved in or otherwise accessible through a cloud based system. As indicated by method step 218, once the customized instructions have been presented to and/or acknowledged by the unique user, one or more of the statistics kept in the gesture usage history may be reset, and the methods begin again. The methods may also include subsequently determining that tasks associated with gestures that were previously assigned as un-learned gestures are consequently later performed using the predefined gesture associated with the task. In this instance, the methods may include updating and re-designating the task as a learned task in the gesture usage history.

In various aspects, the customized instructions may be presented as a multi-media presentation displayed within the vehicle, for example, through a head unit display or navigation display screen. The instructions may graphically illustrate the proper gesture usage for various tasks and controlling vehicle functions. It is envisioned that the customized instructions may also include links to videos or instructions that a user may access from outside of the vehicle.

Figure 3:
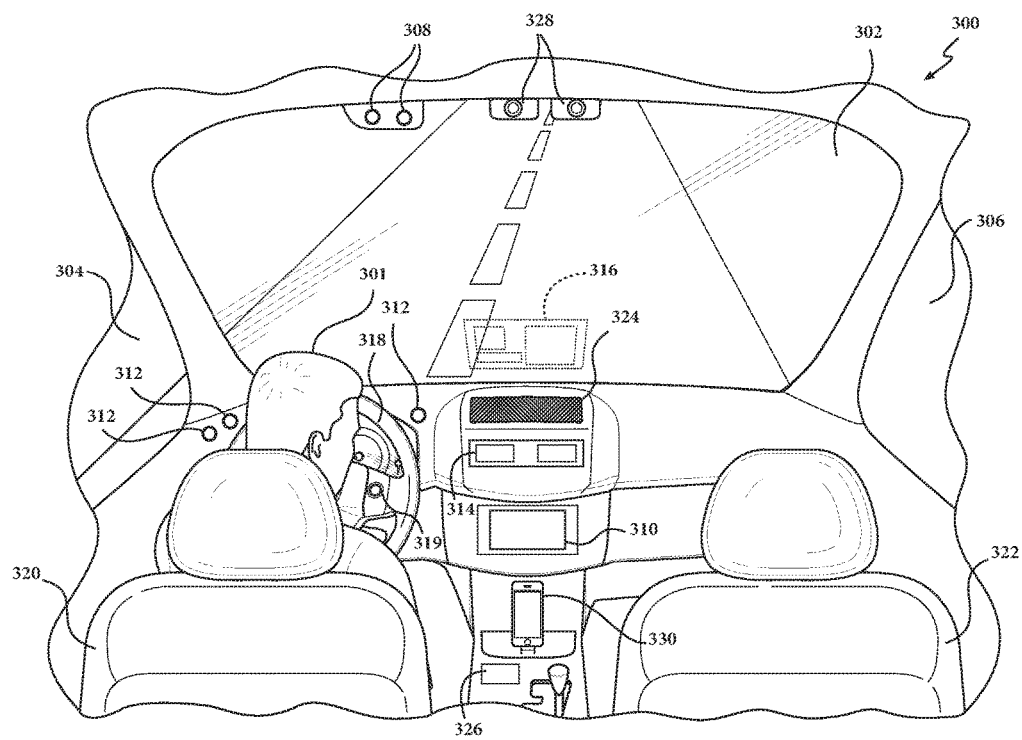
FIG. 3 illustrates a simplified schematic view of one implementation showing the locations of various components that may be used with a system for training a plurality of users on the use of gestures, as seen from within an exemplary interior compartment of a vehicle.

FIG. 3 illustrates a schematic view of an implementation showing the locations of various components that may be used with a system for training at least one of a plurality of users on the use of gestures, as seen from within an exemplary interior compartment 300 of a motor vehicle. The interior compartment 300 typically includes a windshield 302, a left window 304, and a right window 306. One or more visual in-vehicle systems and devices can include a heads up display 316 that is incorporated with the windshield 302 in order to visually convey various information to the user/driver 301 when the user's view is directed towards the road ahead.

The interior compartment 300 may further include eye tracking cameras 308, a navigation display screen 310, and one or more sensors 312 surrounding an instrument cluster, and a gesture recognition device 314. Various sensors 312 may include body sensors, audio trackers, respiratory trackers, and the like. The interior compartment 300 may further include a steering wheel 318 that may include one or more buttons or knobs 319, a left seat 320, a right seat 322, a seat belt, and a heating ventilation and air conditioning (HVAC) system. One or more speakers 324 can be incorporated with various vehicle systems, including their use during the presentation of the customized instructions disclosed herein. The interior compartment 300 may also include driver monitor camera(s) 328. The driver monitoring camera 328 can be located at various locations within the vehicle, and can include multiple cameras located on opposing sides in a stereo camera implementation, for example, that may assist with facial recognition and three-dimensional gestures. One or more touch pads 326, or similar touch sensitive devices may be located throughout the interior compartment 300. Although illustrated in the center console, it should be understood that the touch pad 326 can be placed in other locations accessible by the user, including placement on the steering wheel, if desired.

In various aspects, a portable device 330, such as a phone or tablet may be used to identify the unique user to one or more vehicle systems via Bluetooth or similar technology. The portable device 330 is preferably located inside the motor vehicle 300 during operation. It should be understood that such a portable device is optional, and if not used, a unique user can identify herself via other manual input means. It is envisioned that in certain aspects, a camera on the portable device 330 can be used as the driver monitor camera 328, or in combination therewith. The portable device 330 can interface with the vehicle systems through known docking systems and network control circuitry. If the portable device 330 includes touch sensitivity features, it may also be used to capture gestures.

In certain aspects, the customized instructions presented to the unique user can include non-visual outputs, such as sound output from audio speakers. The portable device 330 can also output warnings and/or alerts visually, audibly, and/or haptically. Thus, the portable device 330 can be used to provide various instructions via visual outputs (e.g., on an LCD screen), auditory outputs (e.g., audio speakers or a piezoelectric transducer), and haptic outputs (e.g., vibrations) to unique users as desired.

Figure 4:
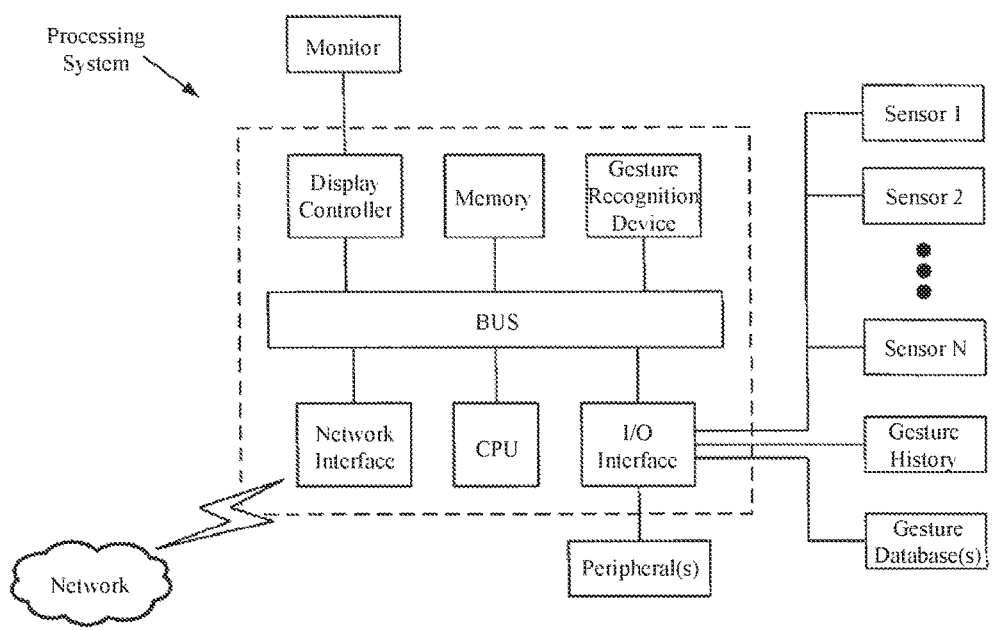
FIG. 4 illustrates a simplified schematic view of various hardware and components for use with the systems of the present technology.

FIG. 4 illustrates a simplified schematic view of various hardware and components used with the systems of the present technology. In various aspects, systems in accordance with this disclosure can include a display controller and a suitable monitor, preferably disposed within the vehicle. The monitor may be affiliated with a navigation system, entertainment system, or head unit. The monitor itself may be touch sensitive and/or include a touch screen configured to accept or otherwise receive, decipher, and transmit signals and data related to two-dimensional gestures, such as single and multiple finger gestures and sliding movements. In other aspects, the one or more touch pads may also or alternatively be used to receive the gestures.

The monitor may work with a separate or integrated gesture recognition device that can include any suitable combination of circuitry and software for identifying and processing gestures from the plurality of users. The gesture recognition device 314 may also operate in combination with various other cameras, such as the driver monitor camera 328, or the portable device 330 in order to receive gestures that comprise three-dimensional movements, including hand movements, arm movements, head movements, facial movements, and the like. Facial recognition software may also be used. For example, the gesture recognition device, alone or in combination with other components may be able to detect and identify hand or facial gestures exhibited by each unique user, which can then be used to complete various tasks related to vehicle functions. In one aspect, the gesture recognition device may be fixed to some part of the interior compartment 300, and the user may direct any relevant gestures towards the device. As another example, at least a part of the gesture recognition device may be portable, meaning the user could manipulate the device in a predetermined manner to initiate a vehicle function, such as by moving the device in a back-and-forth motion. In this example, the gesture recognition device can be communicatively coupled to an interface of the passenger/interior compartment 300, such as a steering wheel or the instrument panel, either wirelessly or through a wired connection.

The display controller may include at least one graphic processing unit, which can be provided by a plurality of graphics processing cores, for improved computational efficiency. The display controller or portions thereof can also be incorporated into one or more processors. Additionally, an I/O (input/output) interface may be provided for inputting signals and/or data from sensors including a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with an integral or separate touch-sensitive or gesture-detecting interface for providing a command/instruction interface.

In certain aspects, the I/O interface may be connected to a mobile or portable device 330 as discussed above, such as a smartphone, a portable storage device, and/or a global position system (GPS) device or another positioning device. The I/O interface may include a Universal Serial Bus (USB) hub, Bluetooth circuitry, Near Field Communication (NFC) circuitry, or other similar wired or wireless communication circuits. In some aspects, the mobile device can also provide sensor input, navigation input, and/or network access.

One or more of the above-noted components can be coupled to a network, such as the Internet, a local intranet, and/or a cloud based system via a network interface for the transmission or reception of data, including controllable parameters. The network interface can include one or more IEEE 802 compliant circuits. A central BUS may be provided to connect the above hardware components/circuits together and provides at least one path for digital communication there between.

The processing system may include one or more processors, a computer, terminal, or personal device, such as a tablet computer or a mobile phone. Various databases, including gesture databases, gesture libraries, and gesture histories, may be used to store information locally or remotely. If stored remotely on a server, the server may include components similar to or the same as the processing system. These devices may communicate via the network.

Suitable software, such as an operating system or an application, can be tangibly stored on a computer readable medium of a processing system, including the memory and storage devices. Other commonly used or known computer readable media from which a computer can read can also be used. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The various procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, microcode, etc.), or through a combination of dedicated hardware components and general processors that are configured by specific algorithms and process codes. Executable code that is executed by hardware may be embodied on a tangible, non-transitory memory devices.

It should be understood that computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A computer-implemented method for training a plurality of users of a vehicle to use gestures for controlling vehicle functions, the method comprising:
    determining that a task related to controlling a vehicle function has been manually completed by a unique user of the vehicle without using a predefined gesture associated with the task;
    designating the predefined gesture associated with the task as being an un-learned gesture;
    determining, after a predetermined time period, that a gesture usage history associated with the unique user includes at least one un-learned gesture; and
    presenting, to the unique user, customized instructions that at least one un-learned gesture is available for use as a short-cut for controlling a vehicle function.

2. The computer-implemented method according to claim 1, further comprising updating the gesture usage history to maintain a count of a number of times each task is completed without using the gesture associated with the respective task.

3. The computer-implemented method according to claim 2, further comprising determining the count exceeds a predetermined value prior to presenting the customized instructions to the unique user.

4. The computer-implemented method according to claim 1, comprising:
    determining the gesture usage history includes a plurality of un-learned gestures; and
    presenting, to the unique user, instructions that at least one of the plurality of un-learned gestures is available for use as a short-cut for controlling a vehicle function.

5. The computer-implemented method according to claim 1, further comprising:
    resetting the gesture usage history after presenting the customized instructions to the unique user.

6. The computer-implemented method according to claim 1, comprising basing the predetermined time period on a number of calendar days during which the vehicle is driven by the unique user.

7. The computer-implemented method according to claim 1, comprising basing the predetermined time period on a number of hours driven by the unique user.

8. The computer-implemented method according to claim 1, comprising basing the predetermined time period on a number of miles driven by the unique user.

9. The computer-implemented method according to claim 1, comprising presenting the customized instructions to the unique user as a multi-media presentation displayed within the vehicle.

10. The computer-implemented method according to claim 1, wherein the predefined gesture comprises a three dimensional movement.

11. The computer-implemented method according to claim 1, wherein the predefined gesture comprises a two dimensional movement received by a touch pad or touch screen device in communication with the vehicle.

12. The computer-implemented method according to claim 1, further comprising:
    subsequently determining that the task has been completed by the unique user using the predefined gesture associated with the task; and redesignating the predefined gesture associated with the task as being a learned gesture.

13. A computer-implemented method for training a plurality of users of a vehicle to use gestures as a short-cut for controlling vehicle functions, the method comprising:
monitoring a plurality of tasks related to controlling vehicle functions that have been completed by each unique user of the vehicle;
determining, for each task, whether the task has been completed by the unique user either: (a) using a predefined gesture associated with the task; or (b) manually, without using the predefined gesture associated with the task;
designating, for each task, the predefined gesture associated with the task as being either: (a) a learned gesture, if the unique user completed the task using the predefined gesture associated with the task; or (b) an un-learned gesture, if the unique user manually completed the task;
determining, after a predetermined time period, that a gesture usage history associated with the unique user includes at least one un-learned gesture; and
presenting, to the unique user, customized instructions that at least one un-learned gesture is available for use as a short-cut for controlling a vehicle function.

14. The computer-implemented method according to claim 13, further comprising updating the gesture usage history to maintain a count of a number of times each task is completed manually, and determining the count exceeds a predetermined value prior to presenting the customized instructions to the unique user.

15. The computer-implemented method according to claim 13, comprising basing the predetermined time period on one or more of:
a number of calendar days during which the vehicle is driven by the unique user;
a number of hours driven by the unique user; and
a number of miles driven by the unique user.

16. The computer-implemented method according to claim 13, comprising presenting the customized instructions to the unique user as a multi-media presentation displayed within the vehicle.

17. The computer-implemented method according to claim 13, wherein the predefined gesture comprises one or more of:
a three dimensional movement; and
a two dimensional movement received by a touch pad or touch screen device in communication the vehicle.

18. A system for training a plurality of users of a vehicle to use gestures for controlling vehicle functions, the system comprising:
one or more sensors configured to receive gesture information; and
a computing device in communication with the one or more sensors, comprising:
one or more processors for controlling operations of the computing device; and
a non-transitory computer readable medium for storing data and program instructions used by the one or more processors, wherein the one or more processors are configured to execute instructions stored in the non-transitory computer readable medium to:
determine that a task related to controlling a vehicle function has been manually completed by a unique user of the vehicle without using a predefined gesture associated with the task;
designate the predefined gesture associated with the task as being an un-learned gesture;
determine, after a predetermined time period, that a gesture usage history associated with the unique user includes at least one un-learned gesture; and
present, to the unique user, customized instructions that at least one un-learned gesture is available for use as a short-cut for controlling a vehicle function.

19. The system according to claim 18, wherein the processors are further configured to execute instructions stored in non-transitory computer readable medium to base the predetermined time period on one or more of:
a number of calendar days during which the vehicle is driven by the unique user;
a number of hours driven by the unique user; and
a number of miles driven by the unique user.

20. The system according to claim 18, wherein the one or more sensors are configured to detect at least one of:
a three dimensional movement; and
a two dimensional movement received by a touch pad or touch screen device.

* * * * *